(12) United States Patent
Lewis et al.

(10) Patent No.: US 7,073,241 B1
(45) Date of Patent: Jul. 11, 2006

(54) METHOD OF MANAGING TOOL TRAVEL IN AN ASSEMBLY LINE OPERATION

(75) Inventors: Brad Lewis, Centerville, TN (US); Robert J. Heginbottom, Santa Fe, TN (US)

(73) Assignee: Limitool, LLC, Spring Hill, TN (US)

( * ) Notice: Subject to any disclaimer, the term of this patent is extended or adjusted under 35 U.S.C. 154(b) by 154 days.

(21) Appl. No.: 10/761,084

(22) Filed: Jan. 20, 2004

(51) Int. Cl.
*B21D 39/03* (2006.01)

(52) U.S. Cl. .......................................... 29/430; 29/428

(58) Field of Classification Search ................. 29/430, 29/429, 428, 33 P, 714, 700, 707, 709, 711, 29/712, 720, 721, 722; 198/341.09, 341.05
See application file for complete search history.

(56) References Cited

U.S. PATENT DOCUMENTS

| | | | | |
|---|---|---|---|---|
| 4,453,303 A | * | 6/1984 | Leddet | ..................... 29/407.05 |
| 5,207,309 A | * | 5/1993 | Simpkin et al. | ....... 198/341.09 |
| 2004/0211051 A1 | * | 10/2004 | Gass | ............................ 29/564 |

* cited by examiner

*Primary Examiner*—John C. Hong
(74) *Attorney, Agent, or Firm*—Waddey and Patterson, P.C.; Howard H. Bayless

(57) ABSTRACT

A method of repositioning the pivot point of the assembly tool and using a tether assembly to limit the tool travel of the assembly tool in provide an assembly tool reduced travel envelope that only overlaps the position of the point-of-use of an in-station work-piece and does not overlap the position of the point-of-use of any out-of-station work-piece. The method includes the steps of: calculating and positioning the pivot point a horizontal offset distance from a conveyor reference point, calculating the reduced travel distance, and attaching the tether assembly to the flexible conduit of the assembly tool so as to limit the tool travel to the reduced travel distance.

25 Claims, 8 Drawing Sheets

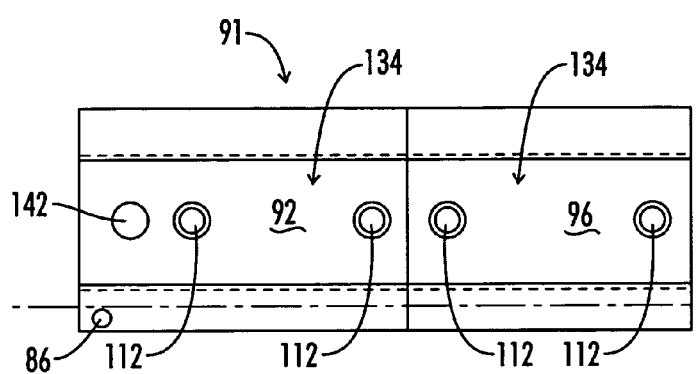
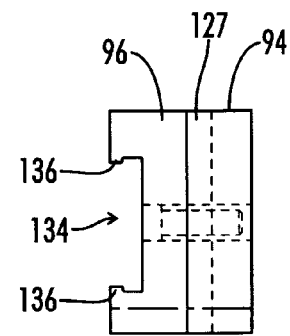
FIG. 10    FIG. 12
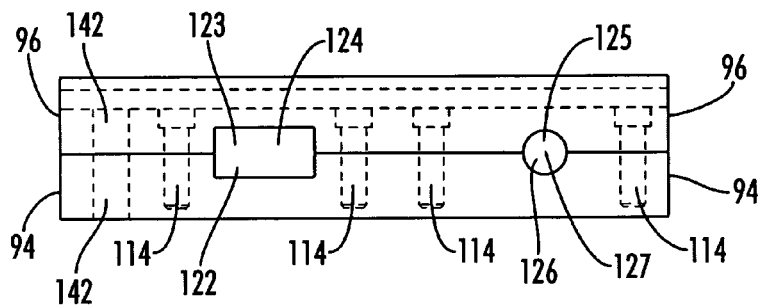
FIG. 11

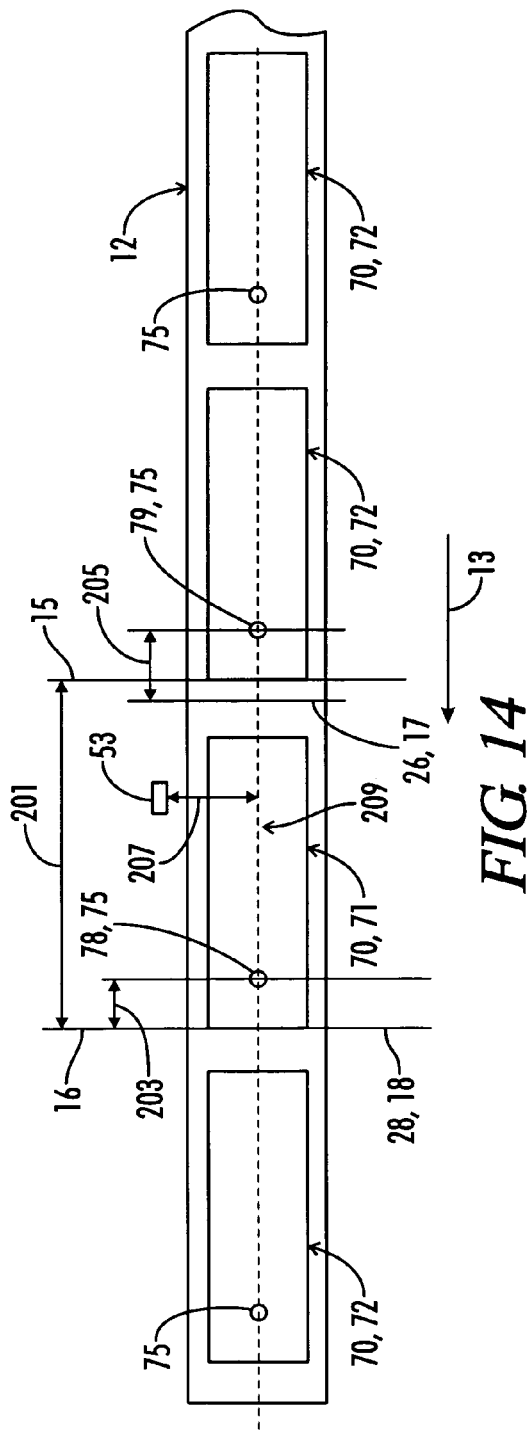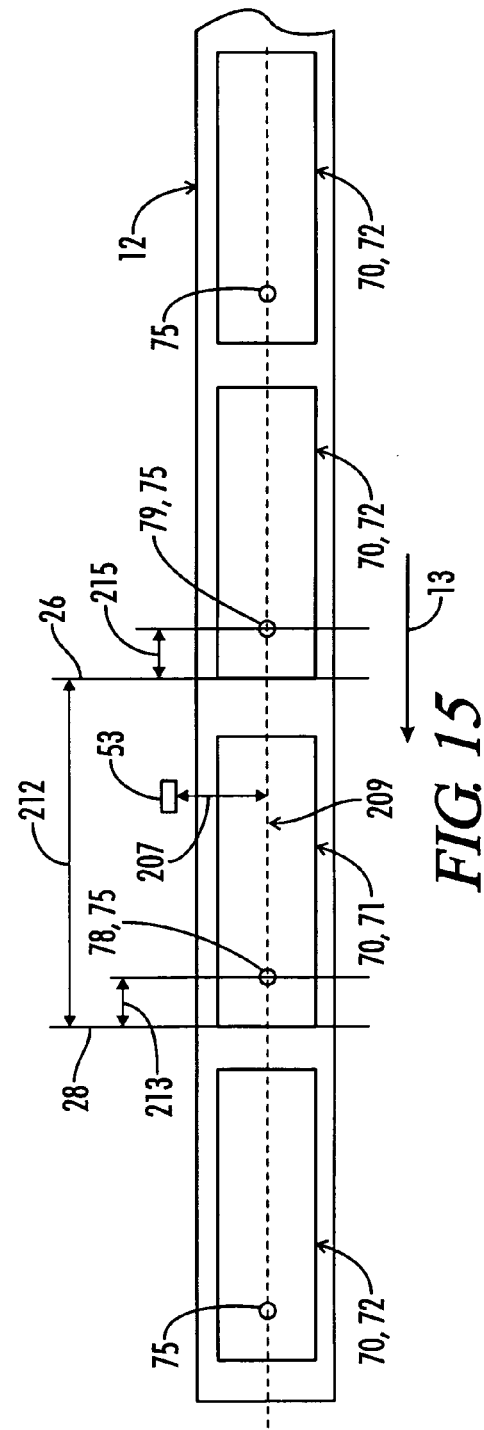

METHOD OF MANAGING TOOL TRAVEL IN AN ASSEMBLY LINE OPERATION

Be it known that we, Robert J. Heginbottom, a citizen of the United States, residing in Santa Fe, Tenn.; and Bradley A. Lewis, a citizen of the United States, residing in Centerville, Tenn.; have invented a new and useful "System and Method of Managing Tool Travel in an Assembly Line Operation". The inventors have concurrently filed on Jan. 20, 2004 a related application for an "Apparatus and System to Manage Tool Travel in an Assembly Line Operation" now given Ser. No. 10/760,832.

BACKGROUND OF THE INVENTION

The present invention relates generally to assembly tools and methods of manufacture associated with the sequential assembly of work-pieces. More particularly, this invention pertains to managing assembly tool travel in moving work-piece assembly manufacturing systems such as moving conveyor systems or automatic guided vehicle (AGV) systems. Even more particularly, this invention pertains to limiting the travel of electrical, pneumatic or hydraulically powered assembly tools used within station work envelopes of a moving work-piece manufacturing system.

FIG. 1 shows a portion of a moving work-piece assembly manufacturing system 10. The example shown is of a typical vehicle manufacturing system using a conveyor system 11 to transport work-pieces 70 within a conveyor footprint 12 along a direction of travel 13. A conveyor footprint 12, as used herein, is the physical space traversed by a conveyor system 11 and work-pieces 70 transported by the conveyor system 11.

In conventional assembly line manufacturing, work-pieces under assembly are moved into a work station, work station specific assembly operations are performed on the work-pieces and the work-pieces are moved out of the work station for any needed further assembly operations. Typically, work stations are organized along the conveyor footprint in generally single or branched path linear configurations according to the predetermined sequence of assembly operations to be performed upon the work-pieces. However, non-linear path assembly line configurations may also employ similar work stations.

A work station, as used herein, is the designated physical space within which a designated assembly operation is performed upon a work-piece positioned within the space. A work station envelope is the perimeter of the physical space of the work station. A work station envelope may be defined in one, two or three dimensions as necessary to practically delimit the work station envelope within an assembly line configuration. For example, FIG. 1 shows the overhead plan of a linearly configured portion of a vehicle manufacturing assembly line. Work station envelope 22 is defined along the direction of travel 13 by the intersection of work station forward boundary 26 with the conveyor footprint 12 and by the intersection of the work station rear boundary 28 with the conveyor footprint 12. FIG. 1 shows in-station work-piece 71 within work station envelope 22 and out-of-station work-pieces 72 outside of work station envelope 22. Since the work-pieces 70 move in a linear fashion along conveyor footprint 12 of this assembly line, there is no need to precisely define the perimeters of work station envelope 22 in the directions orthogonal to the direction of travel 13.

Work stations have at least one associated assembly tool 40. Each associated assembly tool 40 is designed to perform a designated assembly operation upon a work-piece 71 positioned within the work station envelope 22. Each designated assembly operation is performed at a designated point-of-use 75 located on each work-piece 70. In many critical assembly operations the point-of-use 75 is a unique point on each work-piece 70. For example, a designated assembly operation may be torquing the pinch bolt for a steering column yoke. In order to ensure that the proper bolt is torqued, the bolt may have a uniquely configured torquing means, such as a uniquely shaped or sized bolt cap. The associated assembly tool 40 would have a correspondingly configured torquing means, such as a torque socket uniquely shaped and sized to securely receive the unique bolt cap. This ensures that the associated assembly tool 40 in work stations 20 designed to perform a critical assembly operation can only be used at the designated point-of-use 75 on each work-piece 70. Herein, it is assumed that associated assembly tools 40 in work stations 20 can only be used at the designated point-of-use 75 on each work-piece 70.

Assembly tools 40 may be of various types and configurations depending upon the required assembly operations and the method of assembly. Assembly tools may be manual, semi-automated or fully automated. In many conventional assembly line operations, such as shown in FIG. 1, the assembly tools 41 of work stations 20 are semi-automated. These semi-automated tools 41 are characterized as being powered tools requiring at least some operator manipulation to position the tool to its point-of-use 75 upon the work-piece 70, 71 and operator manipulation to activate the tool. Powered assembly tools 41 may consist of a power and control unit 42 connected to an end-use device 43 by a flexible power transfer section 45. One typical end-use device 43 is a torque driver. Typical flexible power transfer sections 45 are power transfer conduits 46 such as electrical control cables, cords, and pneumatic or hydraulic hoses.

Work stations assembly tools are frequently limited in their travel. Assembly tools may be tethered by flexible structures such as a cord or cable, or by articulated structures such as manipulator arms. Tethers may be elastic or non-elastic and may include: power transmitting tethers such as electrical control cables, electrical power cables, or pneumatic or hydraulic hoses connecting a drive unit to an end-use device; non-power transmitting tethers such as cords, chains, wires, or cables; or combinations thereof. Assembly tool flexible power transfer sections 45 such as electrical control cables, electrical power cables, and pneumatic or hydraulic hoses are the most common form of tether.

These electrical control cables, electrical power cables, and pneumatic or hydraulic hoses are usually supplied by the assembly tool 40 manufacturer and are of standard lengths. The point of attachment of these flexible power transfer sections 45 is a pivot point 53. At maximum extension the flexible power transfer section 45 of assembly tool 40 is shown in FIG. 1, limiting travel of the end-use device 43 to an assembly tool travel envelope 50. The tool travel envelope 50 shown in FIG. 1 is the area within a semi-circle overlaying the conveyor footprint 12.

A tool travel envelope 50, as used herein, is the designated physical space within which the tool travel of the end-use device 43 of a designated assembly tool 40 is physically limited. A tool travel envelope 50 may be defined in one, two or three dimensions as necessary to practically delimit the tool travel envelope 50 within an assembly line configuration.

As shown in FIG. 1, the assembly tool travel envelope 50 of designated assembly tool 40 greatly exceeds work station footprint 24. Assembly tool travel envelope 50 overlaps three work-pieces 70, including the in-station work-piece 71 and portions of a upstream (relative to direction of travel 13) out-of-station work-piece 72 and portions of a downstream out-of-station work-piece 72. Each of the three work-pieces 70 has a designated point-of-use 75 associated with the work station 20. Only the in-station work-piece 71 has in-station point-of-use 75, 78 that would be the correct point-of-use for the associated assembly tool 40 to be used to perform the designated assembly operation during the time work-piece 71 is positioned within the work station envelope 22. However, it is possible for an operator to position the associated assembly tool 40 on the out-of-station point-of-use 75, 79 of the upstream out-of-station work-piece 72. Here the designated point-of-use 75 on each work-piece 70 is a single operation point-of-use 76 requiring only a single activation of the assembly tool 40. A single bolt requiring torquing would be an example of a single operation point-of-use 76.

A similar configuration and effect is shown in FIG. 2. FIG. 2 shows a second work station 21 having a second work station envelope 23, second work station footprint 25, defined along the direction of travel 13 by the intersection of second work station forward boundary 27 with the conveyor footprint 12 and by the intersection of the second work station rear boundary 29 with the conveyor footprint 12. A second assembly tool 60 is shown having a power and control unit 61 connected to an end-use device 63 by a flexible power transfer section 65. The point of attachment 56 of these flexible power transfer sections 65 is a pivot point 57. At maximum extension the flexible power transfer section 65 of assembly tool 60 limits travel of the end-use device 63 to an assembly tool travel envelope 51.

Note that the second work station 21 overlaps work station 20. This is permissible where the end use device of assembly tool 40 is configured so as not to be operable upon the designated point-of-use of the second assembly tool 60 and where the end use device of the second assembly tool 60 is configured so as not to be operable upon the designated point-of-use of assembly tool 40.

Assembly tool travel envelope 51 of designated assembly tool 60 greatly exceeds work station footprint 25. Assembly tool travel envelope 60 overlaps three work-pieces 70, including the in-station work-piece 71 and portions of a upstream (relative to direction of travel 13) out-of-station work-piece 72 and portions of a downstream out-of-station work-piece 72. Each of the three work-pieces 70 has a designated second point-of-use 74 associated with the work station 21. Only the in-station work-piece 71 has in-station points-of-use 74, 78 that would be the correct point-of-use for the associated assembly tool 60 to be used to perform the designated assembly operation during the time in-station work-piece 71 is positioned within the work station envelope 23. However, it is possible for an operator to position the associated assembly tool 60 on the out-of-station point-of-use 74, 79 of either the upstream or downstream out-of-station work-pieces 72. Here, the designated second point-of-use 74 is a multiple operation point-of-use 77 and requires multiple activations of assembly tool 60. Multiple bolts at essentially the same location that requiring torquing would be an example of a multiple operation point-of-use 77.

The configurations of FIGS. 1 and 2 and other similar configurations of the moving work-piece assembly manufacturing system 10 each allow an operator to perform the designated assembly operation on an out-of-station work-piece 72. If such an error is not noticed and corrected, the current in-station work-piece 71 may be shipped in a defective condition with a designated assembly operation not performed. If the designated assembly operation is a critical assembly operation, the safety of the work-piece may be impaired. The result of such errors may be expensive rework or costly product recalls.

Many conventional assembly line operations, such as automobile assembly lines, employ electronic monitoring systems to improve the quality control and proper performance of designated assembly operation upon the proper, in-station work-pieces 71. Conveyor systems 11 commonly use electronic sensors to monitor the movement of work-pieces 70 at various positions along the conveyor footprint 11. The work-pieces may be uniquely identified and their movement along the conveyor 11 may be recorded in a software database for quality control analysis. Conveyor systems 11 may also use interlocks that have various functions. For example, it is known to interlock the operation of an assembly tool 40 with the signal of a sensor to prevent activation of the assembly tool 40 unless it determines that a work-piece requiring the designated assembly operation is positioned within the work station 22. It is also known to limit the number of activations of the assembly tool 40 to the number necessary to perform the designated assembly operation. In many cases the operation of the assembly tool is interlocked to the conveyor and will stop the assembly line if the required number of operations are not registered as performed on the in-station work-piece within a work station. These interlocks may operate independently or may be part of an integrated conveyor monitoring and control system.

One such conveyor monitoring and control system and method is the Error Proofing System used by in certain vehicle assembly lines. The Error Proofing System is an integrated conveyor monitoring and control system in which activation of the assembly tool 40 is interlocked such that with the system only allows activation of the assembly tool 40 when activation parameters are met, herein termed system authorized activation. The Error Proofing System also limits the number of activations of the assembly tool 40 to the number necessary to perform the designated assembly operation. The Error Proofing System will stop the assembly line if the required number of operations for an authorized activation of an assembly tool 40 are not sensed as having been performed prior to the system determining that the in-station work-piece 71 is exiting a work station 20. This determination may be based on several factors including elapsed time in the work station 20 and/or sensed movement of the in-station work-piece 71.

Among other monitoring devices, the Error Proofing System uses interlocked sensors placed at reference points to monitor and control the movement of work-pieces 70 along the conveyor footprint 12. The Error Proofing System continually updates and references a software controlled database based, in part, upon the sensing of movements of uniquely identified work-pieces 70 through these reference points. One type of monitored reference point 19 used by the Error Proofing System are fixed stopping points 14.

Referring again to FIG. 1, a first fixed stopping point 15 and a second fixed stopping point 16 are shown. Fixed stopping points 14 are register shift positions for the conveyor monitoring and control system. When the Error Proofing System senses that a work-piece 70 has passed the first fixed stopping point 15, certain database registers are reset. The Error Proofing System will no longer register the activation of the assembly tool 40. Authorized activation of the assembly tool 40 may also be inhibited.

When an in-station work-piece 71 is determined to have reached the work station forward electronic boundary 17, work-piece 70 is now designated as in-station work-piece 71. Data for the work-piece 71 is now associated with data for the work station 20. The Error Proofing System will now register the activation of the assembly tool 40. Most frequently, the work station forward electronic boundary 17 is equivalent to the work station forward boundary 26, but it is not necessary that the two overlap. The operator should then position the assembly tool 40 upon in station point-of-use 71 and perform the designated assembly operation before the in-station work-piece 71 is determined to have reached the work station rear electronic boundary 18.

When the in-station work-piece 71 is determined to have passed the work station rear electronic boundary 18, the Error Proofing System will no longer register the activation of the assembly tool 40. Authorized activation of the assembly tool 40 may also be inhibited. Most frequently, the work station rear electronic boundary 18 is equivalent to the work station rear boundary 28, but it is not necessary that the two coincide. Generally, the work station rear electronic boundary 18 is also equivalent to a second fixed stopping point 14, but, again, it is not necessary that the two coincide.

When the in-station work-piece 71 is determined to have reached the second fixed stopping point 14, the Error Proofing System will allow the in-station work-piece 71 to exit the work station 20 if recorded parameters indicate that authorized activation of the assembly tool 40 occurred while the work-piece 71 was within the electronically enabled work station envelope. Otherwise, a stop interlock will stop the conveyor system 11 until the error is corrected.

As used herein, the term electronically enabled work station envelope 99 is the perimeter of the physical space of a work station within which a designated assembly operation is to be performed upon a work-piece positioned within the work station space by an authorized activation of the assembly tool and within which such authorized activation of the assembly tool will be registered by a conveyor monitoring and control system. In FIG. 1, the electronically enabled work station envelope 99 is defined along the direction of travel 13 by the intersection of work station forward electronic boundary 17 with the conveyor footprint 12 and by the intersection of the work station rear electronic boundary 18 with the conveyor footprint 12. Since the work-pieces 70 move in a linear fashion along conveyor footprint 12 of this assembly line, there is no need to precisely define the perimeters of electronically enabled work station envelope 99 in the directions orthogonal to the direction of travel 13.

FIG. 1 illustrates that the interlocks of the Error Proofing System can be defeated by simply having the assembly tool travel envelope 50 overlap an out-of-station point-of-use 79. The operator is free to position the assembly tool travel envelope 50 upon out-of-station point-of-use 79. Activation of the assembly tool 40 while thus positioned is registered as an authorized activation of the assembly tool 40 occurring while activation of the assembly tool 40 was authorized for the in-station work-piece 71. The Error Proofing System releases the in-station work-piece 71 from the work station 70 without the designated assembly operation having been performed.

An additional error occurs where the operator positions the assembly tool 40 upon in-station point-of-use 78 prior to in-station work-piece 71 reaching the work station forward electronic boundary 17. Activation of the assembly tool 40 while thus positioned is not registered. The stop interlock will stop the conveyor system 11 when in-station work-piece 71 is determined to have reached the second fixed stopping point 14. The Error Proofing System prevents the in-station work-piece 71 from exiting the work station 70 even though the designated assembly operation has been performed.

What is needed, then, is means of correcting the above identified problems.

SUMMARY OF THE INVENTION

A tether assembly 80 is used in assembly line operations as a means of restricting the length of the flexible power transfer conduit 46 of assembly tools 40 in order that the assembly tool have reduced tool travel envelope 82 which only overlaps the position of the point-of-use 78 on an in-station work-piece 71 and does not overlap the position of the any out-of-station point-of-use 79 on any out-of-station work-piece 72.

The apparatus of the present invention includes a clamping assembly 90 attached to a flexible power conduit 46 of an assembly tool so as to divide the conduit 46 into a tethered travel portion of conduit 87 and an excess portion of conduit 88. Together, the clamping assembly 90 and tethered travel portion of conduit 87 form the tether assembly 80. The tether assembly 80 has a reduced travel distance 81 and provides an assembly tool having a reduced tool travel envelope 82. The clamping assembly 90 is further attached to a pivot point 53 by a flexible cord 84, such as a steel cable.

The clamping assembly 90 includes a clamp 91 attached to flexible power conduit 46. Flexible cord 84 extends through anchor channel 86 disposed in clamp 91 and anchors clamp 91 to pivot point 53. A tamper resistant means 130 is installed upon clamp 91 and includes a tamper resistant shield 132 preventing tampering with the fastening means 110. The tamper resistant shield 132 is held in place by an audit tag locking means 144, which also holds audit tag 140.

Clamp 91 includes a first block 92 having a first block mating surface 93 and a second block 94 having a second block mating surface 95. Block grooves 122 are disposed in the block mating surfaces such that when the clamp 91 is assembled, the block grooves 122 and block mating surfaces 92 form block channels 124, which are sized to securely hold a flexible power conduit 46.

Fasteners 112 holding the blocks together are securely received in fastener channels 114 disposed in alignment within the first block 92 and within the second block 94. Fastener channels 114 are further disposed within the tamper shield channel 134.

A preferred method of the present invention, herein termed Error Proof Scrolling, is followed to reposition the pivot point 53 of the assembly tool 40 and to limit the tool travel of the assembly tool 40 in order to provide an assembly tool reduced travel envelope 82 that only overlaps the position of the point-of-use 78 of the in-station work-piece 71 and does not overlap the position of the point-of-use 79 of any out-of-station work-piece 72.

Error Proof Scrolling includes the steps of: determining the fixed stopping point differential distance 201(designated "X") from a first fixed stopping point 15 to a second fixed stopping point 16. Determining the in-station point-of-use offset distance 203 (designated "Y") from the in-station point-of-use 78 to the second fixed stopping point 16. Determining the position of the work station forward electronic boundary 17. With out-of-station work-piece 72 at the first fixed stopping point 15, determining the out-of-station point-of-use offset distance 205 (designated "Z") from the work station forward electronic boundary 17 to the out-of-station point-of-use 79. Determining the lateral offset distance 207 (designated "R") between pivot point 53 and the horizontal transport line 209 followed by the designated points-of-use 75 along the conveyor footprint 12. Calculating the pivot point horizontal offset distance 211 (designated "P") of the new position of the pivot point 53 from the second fixed stopping point 16 using the formula: P=(X/2)+Y+Z. Where the value of P is greater than X, calculating the pivot point negative horizontal offset distance 213 (designated "−P") using the formula: −P=y−x. Positioning the pivot point 53 the pivot point horizontal offset distance 211 from the second fixed stopping point 16 while maintaining the lateral offset distance 207 between pivot point 53 and the horizontal transport line 209. Calculating the reduced travel distance 81 (designated "D") using the formula: D=Square root of [(X/2)(X/2)+(R*R)]. Installing a clamping assembly 90 upon the flexible power transfer section 45 so as to form a tethered flexible power conduit 47 providing a reduced assembly tool travel envelope 82 having a radius equal to the reduced travel distance 81.

It is an object of this invention to provide an apparatus and system to limit the travel of an assembly tool so that the assembly tool travel envelope only overlaps the position of the point-of-use on the in-station work-piece and does not overlap the position of the point-of-use on any out-of-station work-piece.

It is another object of this invention to provide a means of restricting the length of the flexible power transfer conduit of powered assembly tools so that the assembly tool travel envelope only overlaps the position of the point-of-use on the in-station work-piece and does not overlap the position of the point-of-use on any out-of-station work-piece.

It is yet another object of this invention to provide an apparatus and system to limit the travel of an assembly tool so that the assembly tool travel envelope only overlaps positions of the point-of-use on the in-station work-piece that can be registered and does not overlap positions of the point-of-use on the in-station work-piece that can not be registered.

It is still yet another object of this invention to provide an apparatus and system to limit the travel of an assembly tool that is inexpensive, easy to make and easy to install.

It is a further object of this invention to provide an apparatus and system to limit the travel of an assembly tool that is tamper resistant and whose correct installation is easy to determine and monitor.

It is a yet further object of this invention to provide an apparatus and system for using a clamping system and pivot to manage the shape and size of an assembly tool travel envelope.

It is also an object of this invention to provide a method of calculating proper placement of assembly tool pivot and calculating the length of the tether assembly so that the assembly tool travel envelope only overlaps the position of the point-of-use on the in-station work-piece and does not overlap the position of the point-of-use on any out-of-station work-piece.

It is an object of this invention to provide method of calculating proper placement of assembly tool pivot and calculating the length of the tether assembly so that the assembly tool travel envelope only overlaps positions of the point-of-use on the in-station work-piece that can be registered and does not overlap positions of the point-of-use on the in-station work-piece that can not be registered

BRIEF DESCRIPTION OF THE DRAWINGS

FIG. 10 is an overhead view of an alternate embodiment of the clamping means of the present invention.

FIG. 11 is a longitudinal view of the clamping means of FIG. 10.

FIG. 12 is a transverse view of the clamping means of FIG. 10.

FIG. 14 is the moving work-piece assembly manufacturing system of FIG. 13 showing measurement points and distances used in implementing the Error Proof Scrolling method of this invention.

FIG. 15 is the moving work-piece assembly manufacturing system of FIG. 13 showing measurement points and distances used in implementing the an alternate method of this invention.

DESCRIPTION OF THE PREFERRED EMBODIMENTS

Figure 3:
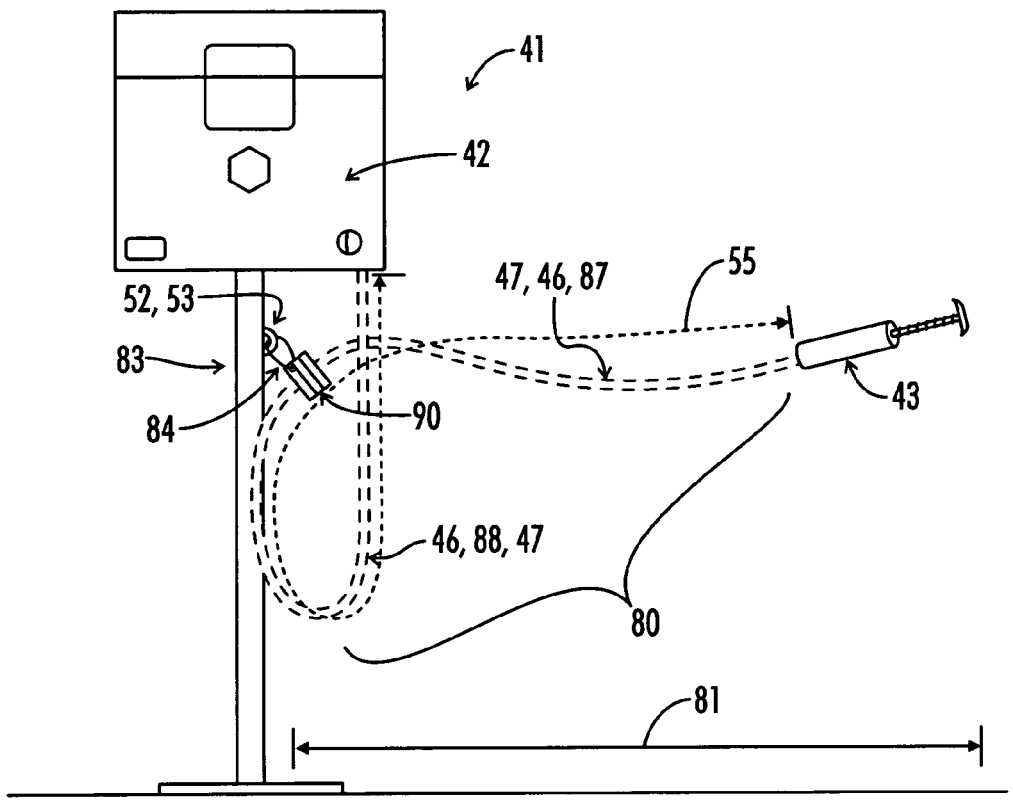
FIG. 3 is one embodiment of a tether assembly of the present invention installed upon an assembly tool.

Referring now to FIG. 3, one embodiment of the present invention is shown, a tether assembly 80 limiting the travel of an assembly tool 40 is shown installed as a powered assembly tool 41 having a power and control unit 42 connected to an end-use device 43 by a flexible power conduit 46, such as electrical control cables, cords, and pneumatic or hydraulic hoses. The flexible power conduit 46 provides the assembly tool 40 a maximum travel distance 55 roughly equivalent to its length. Without the tether assembly 80 installed, the assembly tool 40 would have a tool travel covering its maximum assembly tool travel envelope 50, shown in FIG. 1.

Figure 13:
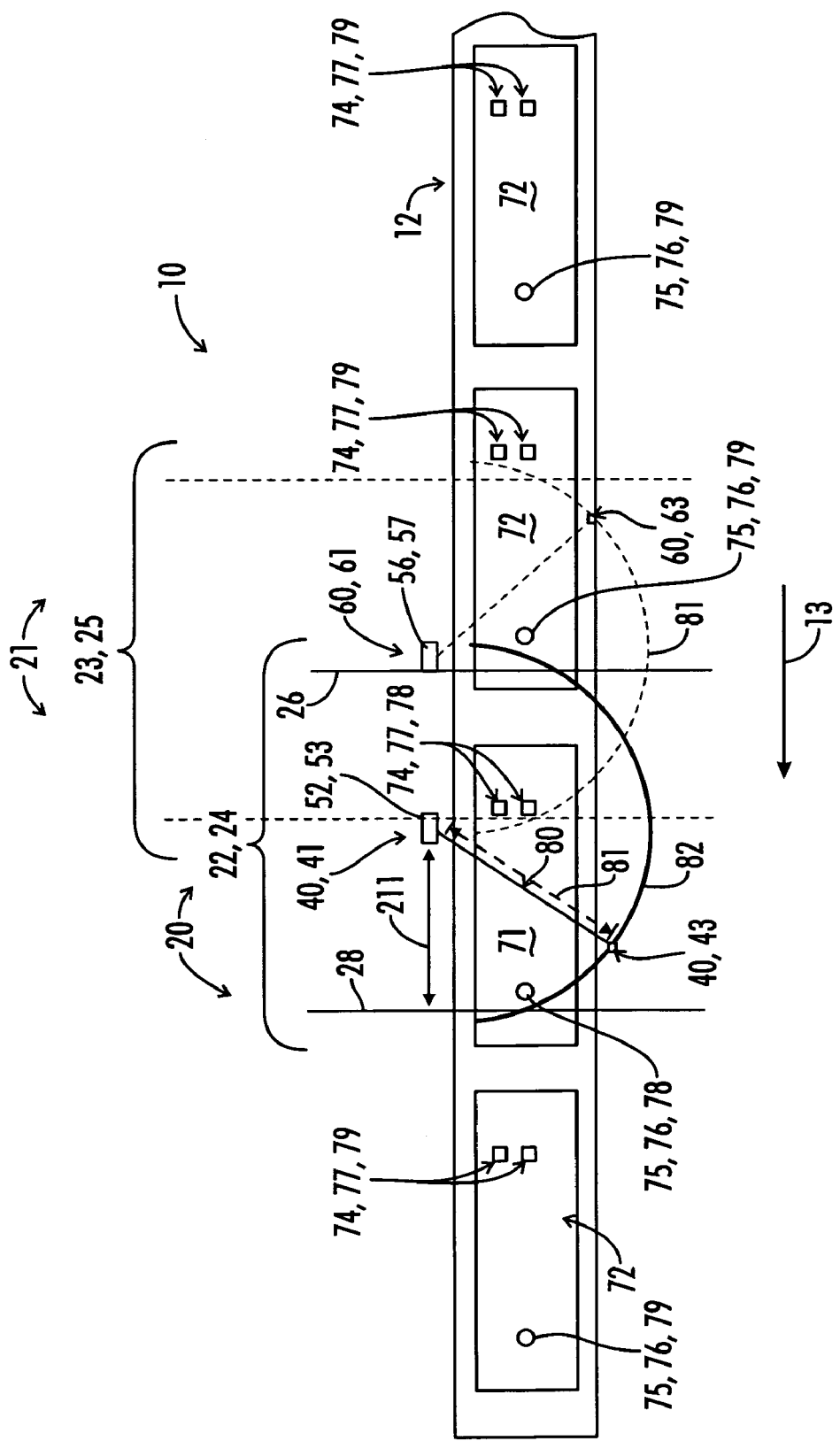
FIG. 13 is the moving work-piece assembly manufacturing system of FIG. 1 with the tethering assembly installed and with the pivots of the assembly tools repositioned and the tool travel reduced according to the method of this invention.

However, FIG. 3 shows that attaching the clamping assembly 90 of the tether assembly 80 to the flexible power conduit 46 divides the conduit 46 into a tethered travel portion of conduit 87 and an excess portion of conduit 88. With the clamping assembly 90 installed, only the tethered travel portion of the conduit 87 is available for assembly tool travel. With the tether assembly 80 installed, the assembly tool 40 has a reduced travel distance 81 which provides only the reduced assembly tool travel envelope 82, as is shown in FIG. 13.

FIG. 3 further shows the clamping assembly 90 attached to a pivot 52 by an anchor means 83. In this embodiment the pivot 52 is a pivot point 53 and the anchor means 83 is a flexible cord 84, such as a steel cable. In other embodiments the pivot 52 is a pivot track upon which an anchor means slides. In yet other embodiments the anchor means 83 is an elastic flexible cord. In still yet other embodiments the anchor means 83 is an articulated structure such as a swing arm.

In an alternate embodiment (not shown) of the clamping assembly 90 of the present invention, clamp 91 is attached to the flexible power conduit 46 at two points so as to form a loop from the excess portion of conduit 88 dividing the two tethered travel portions of conduit 87, one of which is attached to the end-use device 43. In this alternate embodiment the pivot point 53 of the tether assembly 80 is the point of connection of the flexible power conduit 46 to the power and control unit 42.

Where the assembly tool 40 is not a power tool or where it is impractical or otherwise undesirable to attach a clamping means 90 to the flexible power transfer section 45, the tether assembly 80 may include only a flexible cord 84 attached to the end-use device 43 and to the pivot 52. In this alternative embodiment, the length of the flexible cord 84 is selected so the assembly tool 40 has a tool travel covering only the reduced travel distance 81 and provides an assembly tool reduced travel envelope 82, as is shown in FIG. 13. Where the flexible power transfer section 45 is an articulated arm or like structure, the flexible cord 84 may be alternately attached to either the end use device 43 or to a section of the articulated arm.

As is further shown in FIGS. 3 and 13, tether assembly 80 is a means of restricting the length of the flexible power transfer conduit 46 of assembly tools 40 so that the assembly tool reduced travel envelope 82 only overlaps the position of the point-of-use 78 on the in-station work-piece 71 and does not overlap the position of the any out-of-station point-of-use 79 on any out-of-station work-piece 72.

Figure 4:
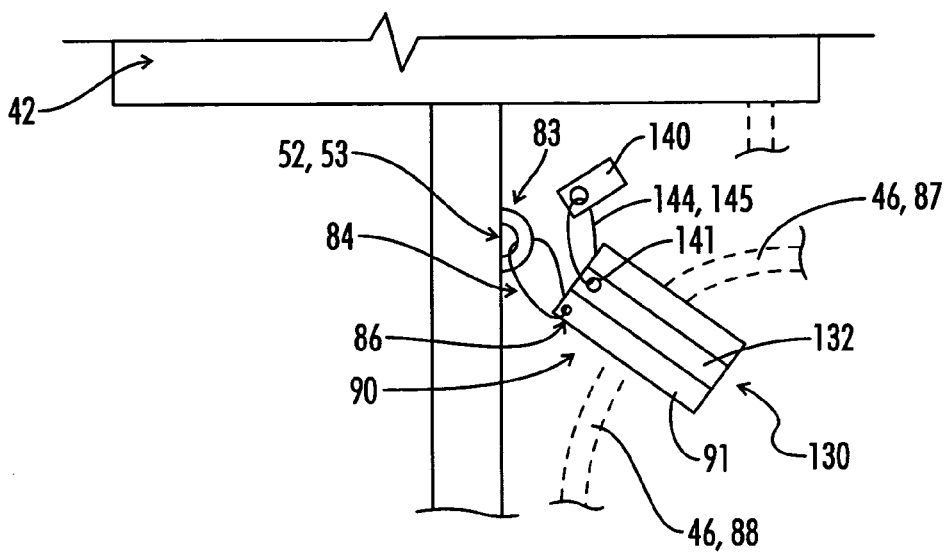
FIG. 4 is a detail of the tether assembly of FIG. 3 showing one embodiment of the clamping means of the present invention.

The tethering assembly 80 shown in FIGS. 3 and 4 is but one preferred embodiment of the present invention. Given the illustration and disclosure of the tethering assembly 80 of the present invention and the above described alternative embodiment, it is anticipated that numerous alternate embodiments of the tethering assembly 80 of this invention would be suggested to one skilled in the art.

Referring now to FIG. 4, the clamping assembly 90 of one preferred embodiment of the present invention is shown. Clamp 91 is shown attached to flexible power conduit 46. Flexible cord 84 extends through anchor channel 86 disposed in clamp 91 and anchors clamp 91 to pivot point 53. A tamper resistant means 130 is shown installed upon clamp 91 and includes a tamper resistant shield 132 preventing tampering with fastening means 110 (not shown). The tamper resistant shield 132 is shown held in place by an audit tag locking means 144, which also holds audit tag 140.

Referring now to FIGS. 5 thru 9, the clamping assembly 90 of FIG. 4 is shown. Clamp 91 includes a first block 92 having a first block mating surface 93 and a second block 94 having a second block mating surface 95. Clamp 91 includes a conduit retaining means 120 for securely holding the flexible power conduit 46. In this embodiment the conduit retaining means 120 includes a block groove 122 disposed in second block mating surface 95. Flexible power conduit 46 is shown disposed within the block groove 122. When the clamp 91 is assembled, block groove 122 and first block mating surface 93 form block channel 124, which is sized to securely hold flexible power conduit 46.

The first block mating surface 93 is shown receiving the second block mating surface 95 and a fastening means 110 securely holds the first block 92 against the second block 94. The fastening means of this embodiment includes fasteners 112 securely received in fastener channels 114 disposed in alignment within the first block 92 and within the second block 94. In this embodiment, fastener channels 114 are further disposed within the tamper shield channel 134. In other embodiments of the clamp 91 of this invention, alternate fastening means are used including clips, mating cleats, bands and mating channels. Given the illustration and disclosure of the present invention and the above described alternative embodiments, it is anticipated that numerous alternate embodiments of the fastening means 110 of this invention would be suggested to one skilled in the art.

Figure 5:
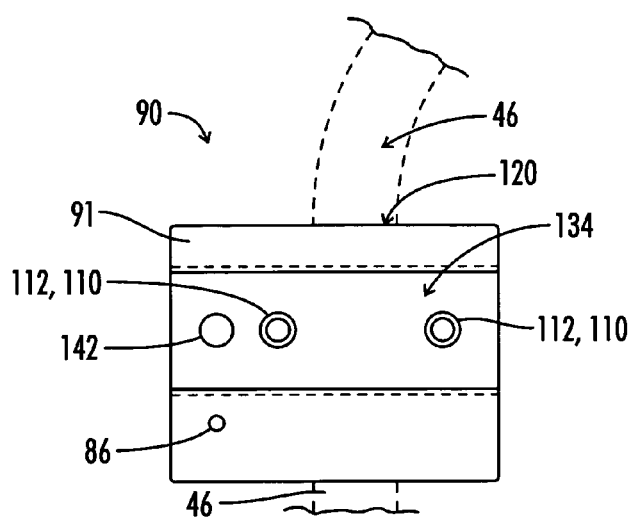
FIG. 5 is an overhead view of the clamping means of FIG. 4 without a tamper resistant shield installed.
Figure 7:
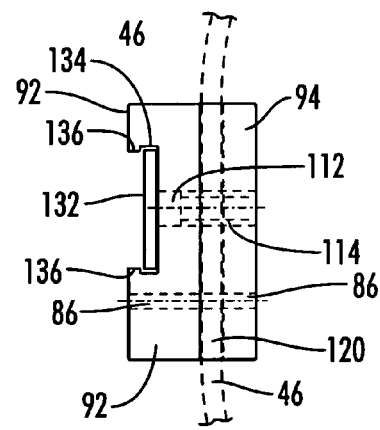
FIG. 7 is a transverse view of the clamping means of FIG. 4.
Figure 6:
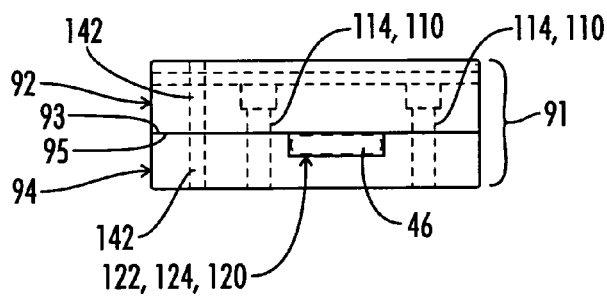
FIG. 6 is a longitudinal view of the clamping means of FIG. 4.
Figure 8:
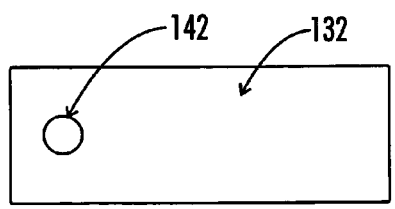
FIG. 8 is an overhead view of the tamper resistant shield of the clamping means of FIG. 3.
Figure 9:
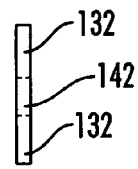
FIG. 9 is a transverse view of the tamper resistant shield of the clamping means of FIG. 3.

Clamp 91 is shown in FIG. 5 having anchor channel 86 disposed in alignment within the first block 92 and within the second block 94. When installed in the tether assembly 80, flexible cord 84 is disposed through anchor channel 86 and attaches clamp 91 to the pivot point 53.

Once the clamp 91 is installed upon the flexible power conduit 46 so as to form a tethered flexible power conduit 47 having the desired reduced travel distance 81, tamper resistant means 130 and audit tag 140 are installed to prevent unauthorized or inadvertent adjustment of the assembly tool travel distance. Referring again to FIGS. 5 thru 9, the tamper resistant means 130 of this embodiment of the present invention includes a tamper shield 132 inserted into longitudinally through one end of the tamper shield channel 134, which is disposed in the first block 92. Overhanging channel rims 136 hold the tamper shield 132 within the tamper shield channel 134 so as to block access to fasteners 112. The tamper shield 132 is prevented from sliding longitudinally out of either end of the tamper shield channel 134 by installation of audit tag locking means 144 through the tamper shield audit tag channel 141 disposed in the tamper shield and further through the block audit tag channel 142 aligned with the tamper shield audit tag channel 141 and disposed in alignment in the first block 92 and the second block 94. As shown in FIG. 4, the audit tag locking means 144 of this embodiment is an audit tag tie wrap installed in the audit tag channels 142, 141 and fastening an audit tag 140 to the clamp 91.

Referring now to FIGS. 10, 11 and 12, an alternate embodiment of the clamp 91 of the present invention is shown. In this embodiment, a first block 92 and a third block 96 are shown mounted upon a second block 94. In this embodiment, a block groove 123 in the first block 92 is aligned with a block groove 122 in the second block 94 to form a block channel 124. Also, a block groove 125 in the third block 96 is aligned with a block groove 126 in the second block 94 to form a block channel 127. This alternate embodiment is useful if the flexible power conduit 46 includes multiple conduits such as an electrical power cord and an end-use device electrical control cord. By dividing the blocks on one side of the clamp 91 into a first block 92 and a third block 96, this embodiment facilitates separate installation and removal of the multiple conduits within clamp 91.

Where block channel 124 and block channel 127 are of the same size and shape, the clamp 91 can be used to secure a loop of excess portion of conduit 88 as discussed above.

Alternate embodiments of the clamp 91 combine various numbers of blocks forming various numbers of channels.

The clamping assemblies 90 shown in FIGS. 5 thru 12 are but two preferred embodiments of the present invention. Given the illustration and disclosure of the clamping assemblies 90 of the present invention and the above described alternative embodiments, it is anticipated that numerous alternate embodiments of clamping assemblies 90 of this invention would be suggested to one skilled in the art.

These blocks are made of material suitable for ease of machining or casting, durability, cost and preventing damage to the flexible power conduit 46. Such suitable material includes nylon block, wood, aluminum, rubber blocks, resilient polymers and combinations thereof.

Figure 1:
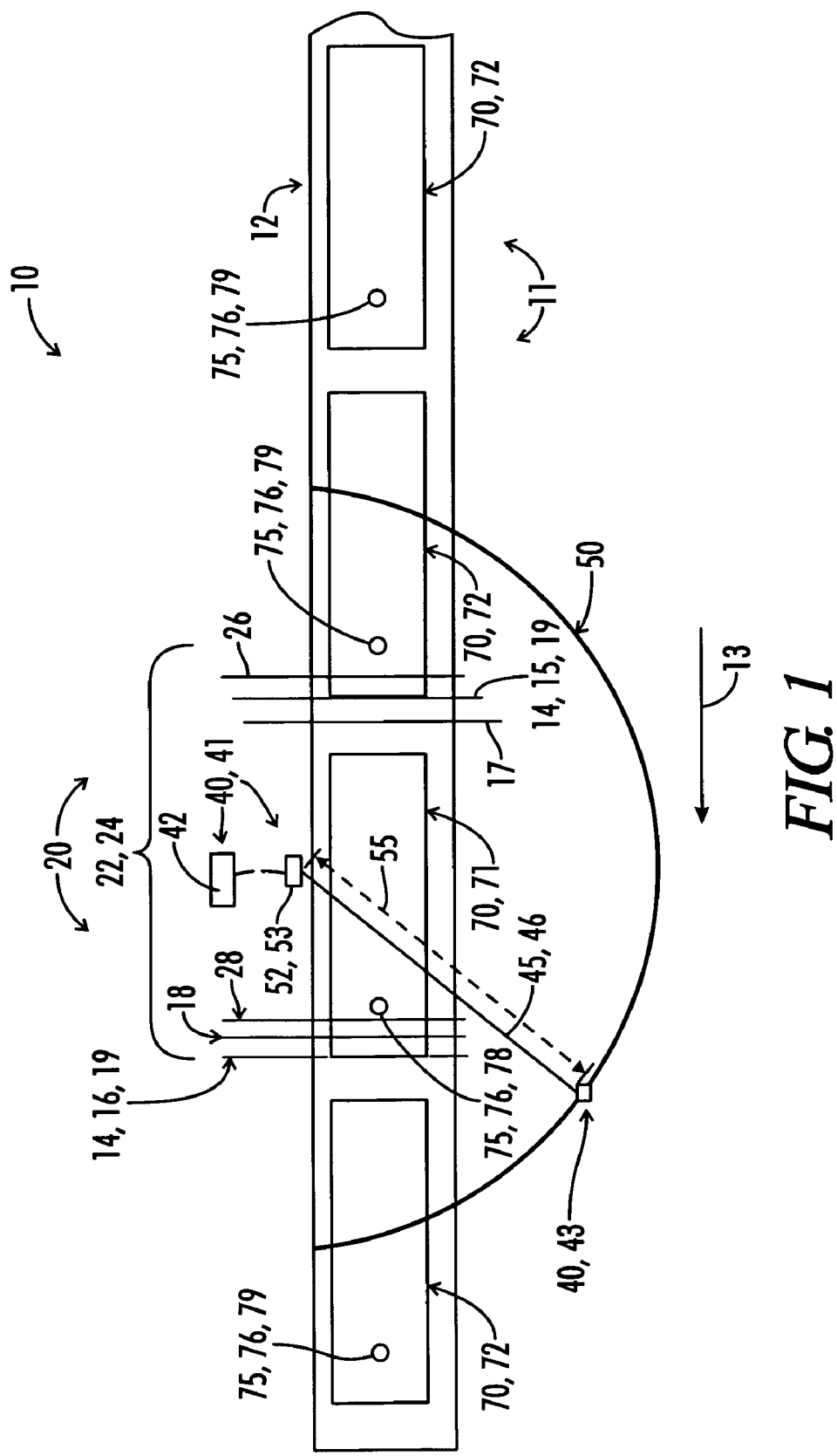
FIG. 1 is a schematic overhead plan view of a portion of a moving work-piece assembly manufacturing system having a conveyor carrying work-pieces through a work station.
Figure 2:
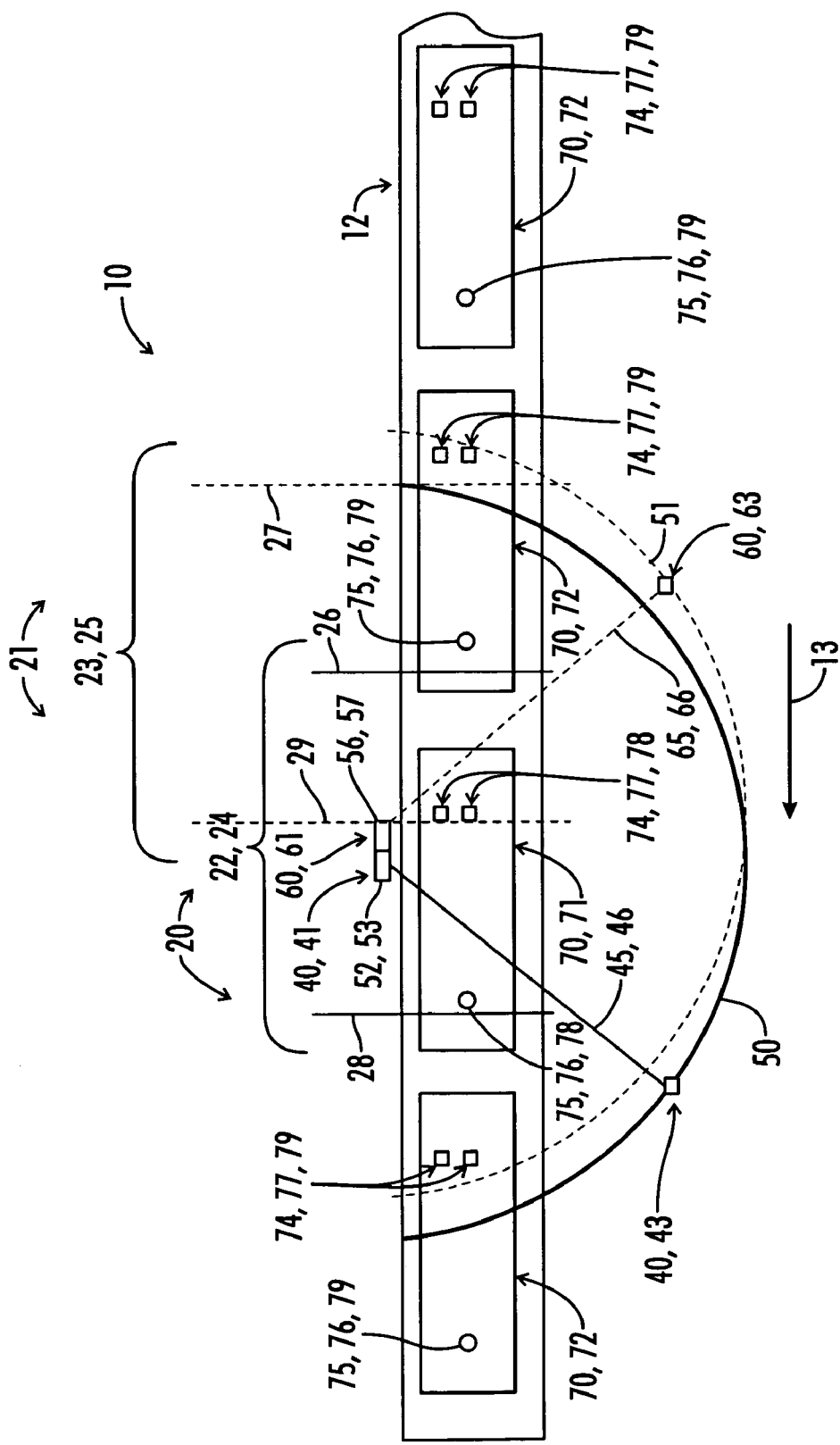
FIG. 2 is the moving work-piece assembly manufacturing system of FIG. 1 with multiple work stations.

Referring now to FIGS. 1, 13 and 14, a preferred method of the present invention, herein termed Error Proof Scrolling, is illustrated. A linearly configured portion of a of conveyor system 11 having work station 20 is shown in FIG. 1. Work station 20 has work station envelope 22 defined along the direction of travel 13 along a conveyor footprint 12. The work station 20 receives in-station work-piece 71 for designated assembly operations within work station envelope 22 and out-of-station work-pieces 72 are queued upstream and outside of work station envelope 22. Work station 20 has at least one associated assembly tool 40 having a pivot point 53 located adjacent to the conveyor footprint 12 at a standard distance from the centerline thereof. (A standard distance being selectable from conventional distances of assembly tool offset for the configuration of the conveyor system.) The assembly tool 40 also has a flexible power transfer conduit 46 and has an assembly tool travel envelope 50 which overlaps the position of the points-of-use 75 on in-station work-pieces 71 and also overlaps at least one out-of-station work-piece 72. Further, the conveyor system 11 includes an integrated conveyor monitoring and control system having a first fixed stopping point 15 and a second fixed stopping point 16 associated with controlling the movement of work-pieces 70 into and out of the work-station 20. Work station 20 has a work station forward electronic boundary 17 which, in this embodiment, is equivalent to work station forward boundary 26. Work station 20 also has a work station rear electronic boundary 18 which, in this embodiment, is equivalent to work station rear boundary 28 and the second fixed stopping point 16.

Referring now to FIG. 14, the Error Proof Scrolling method includes the following steps: Determine the fixed stopping point differential distance 201 (designated "X") from the first fixed stopping point 15 to the second fixed stopping point 16. (The value of distance is always positive) With in-station work-piece 71 at the second fixed stopping point 16, determine the in-station point-of-use offset distance 203 (designated "Y") from the in-station point-of-use 78 to the second fixed stopping point 16. (The value of distance is positive in a downstream direction and negative in an upstream direction) Determine the position of the work station forward electronic boundary 17. With out-of-station work-piece 72 at the first fixed stopping point 15 determine the out-of-station point-of-use offset distance 205 (designated "Z") from the work station forward electronic boundary 17 to the out-of-station point-of-use 79. (This value of distance is positive in a downstream direction and negative in an upstream direction) Determine the lateral offset distance 207 (designated "R") between pivot point 53 and the horizontal transport line 209 followed by the designated points-of-use 75 along the conveyor footprint 12. (This value of distance is always positive) Calculate the pivot point horizontal offset distance 211 (designated "P") of the new position of the pivot point 53 from the second fixed stopping point 16 using the formula: P=(X/2)+Y+Z. If the value of P is greater than X, calculate the pivot point negative horizontal offset distance 213 (designated "−P") using the formula: −P=y−x. Referring now to FIG. 13, position the pivot point 53 the pivot point horizontal offset distance 211 from the second fixed stopping point 16 while maintaining the lateral offset distance 207 between pivot point 53 and the horizontal transport line 209. (Note, the pivot point 53 can be either the power and control unit 42 or another rigid structure remote from the power and control unit 42.) Calculate the reduced travel distance 81 (designated "D") using the formula: D=Square root of [(X/2)(X/2)+(R*R)]. Install a clamping assembly 90 upon the flexible power transfer section 45 so as to form a tethered flexible power conduit 47 providing a reduced assembly tool travel envelope 82 having a radius equal to the reduced travel distance 81.

Referring again to FIG. 13, following the Error Proof Scrolling method to reposition the pivot point 53 of the assembly tool 40 and to limit the tool travel of the of the assembly tool 40 results in an assembly tool 40 having a reduced travel envelope 81 that only overlaps the position of the point-of-use 78 of the in-station work-piece 71 and does not overlap the position of the point-of-use 79 of any out-of-station work-piece 72. The Error Proof Scrolling method also results an assembly tool reduced travel envelope 81 that only overlaps positions of the point-of-use on the in-station work-piece that can be registered and does not overlap positions of the point-of-use on the in-station work-piece that can not be registered.

Referring now to FIGS. 1, 13 and 15, an alternate method of the present invention is illustrated. A linearly configured portion of a of conveyor system 11 having work station 20 is shown. Further, the conveyor system 11 lacks an integrated conveyor monitoring and control system. The work station 20 has a work station envelope 22 defined along the direction of travel 13 along a conveyor footprint 12. The work station 20 sequentially receives in-station work-pieces 71 for designated assembly operations within work station envelope 22 and out-of-station work-pieces 72 are queued upstream and outside of work station envelope 22. Work station 20 has at least one associated assembly tool 40 having a pivot point 53 located adjacent to the conveyor footprint 12 at a standard distance from the centerline thereof. (A standard distance being selectable from conventional distances of assembly tool offset for the configuration of the conveyor system.) The assembly tool 40 also has a flexible power transfer conduit 46. The assembly tool travel envelope 50 overlaps the position of the points-of-use 75 on in-station work-pieces 71 and also overlaps the position of the points-of-use 75 on at least one out-of-station work-piece 72. Work station 20 is defined by work station forward boundary 26 and work station rear boundary 28.

Referring now to FIG. 15, the alternate method includes the steps of: Determine the work station boundary differential distance 212 (designated "X") from work station forward boundary 26 to work station rear boundary 28. (This value of distance is always positive) With in-station work-piece 71 within the work station, determine the in-station point-of-use offset distance 213 (designated "Y") from the in-station point-of-use 78 to the work station rear boundary 28. (This value of distance is positive in a downstream direction and negative in an upstream direction) With out-of-station work-piece 72 queued to enter work station 20, determine the out-of-station point-of-use offset distance 215

(designated "Z") from the work station forward boundary 26 to the out-of-station point-of-use 79. (This value of distance is positive in a downstream direction and negative in an upstream direction) Determine the lateral offset distance 207 (designated "R") between pivot point 53 and the horizontal transport line 209 followed by the designated points-of-use 75 along the conveyor footprint 12. (This value of distance is always positive) Calculate the pivot point horizontal offset distance 211 (designated "P") of the new position of the pivot point 53 from the work station rear boundary 28 using the formula: P=(X/2)+Y+Z. If the value of P is greater than X, calculate the pivot point negative horizontal offset distance 213 (designated "−P") using the formula: −P=y−x. Referring now to FIG. 13, position the pivot point 53 the pivot point horizontal offset distance 211 from the second fixed stopping point 16 while maintaining the lateral offset distance 207 between pivot point 53 and the horizontal transport line 209. (Note, the pivot point 53 can be either the power and control unit 42 or another rigid structure remote from the power and control unit 42.) Calculate the reduced travel distance 81 (designated "D") using the formula: D=Square root of [(X/2)(X/2)+(R*R)]. Install a clamping assembly 90 upon the flexible power transfer section 45 so as to form a tethered flexible power conduit 47 providing a reduced assembly tool travel envelope 82 having a radius equal to the reduced travel distance 81.

Referring again to FIG. 13, applying this alternate method to reposition the pivot point 53 of the assembly tool 40 and to limit the tool travel of the same results in an assembly tool travel envelope 81 that only overlaps the position of the point-of-use 78 of the in-station work-piece 71 and does not overlap the position of the point-of-use 79 of any out-of-station work-piece 72.

Figure 16:
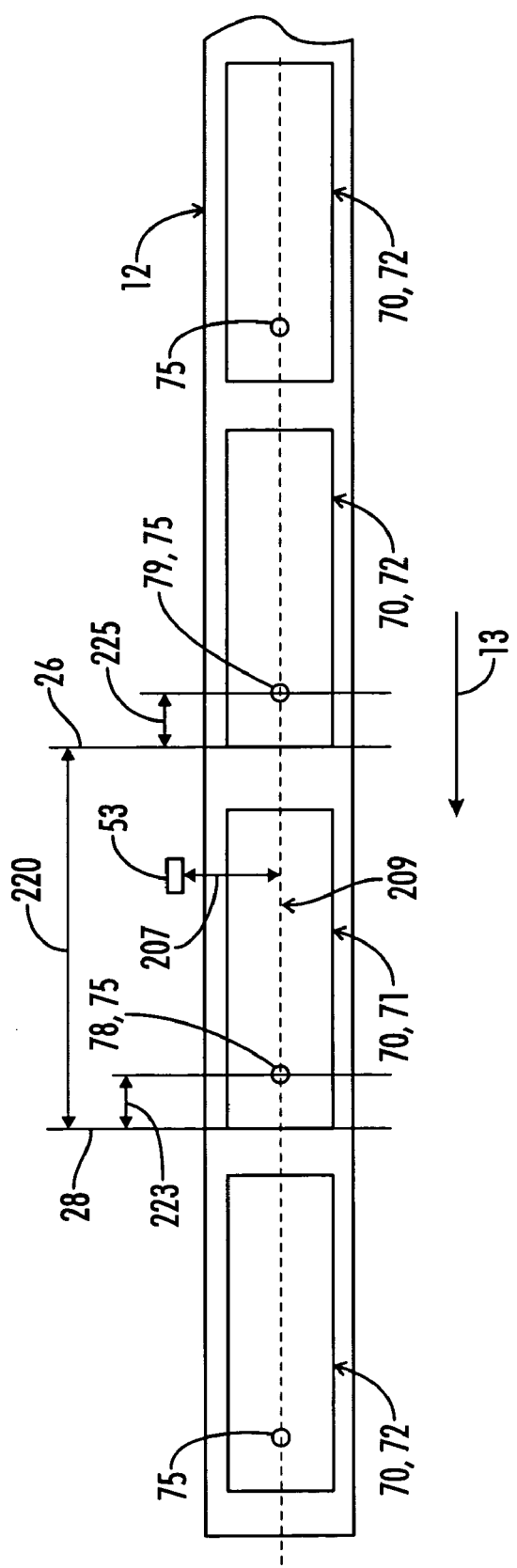
FIG. 16 is the moving work-piece assembly manufacturing system of FIG. 13 showing measurement points and distances used in implementing the a second alternate method of this invention.

Referring now to FIGS. 1, 13 and 16, a second alternate method of the present invention is illustrated. A linearly configured portion of a of conveyor system 11 having work station 20 is shown. Further, the conveyor system 11 includes an integrated conveyor monitoring and control system but lacks fixed stopping points. Work station 20 has an electronically enabled work station envelope 99 defined along the direction of travel 13 along a conveyor footprint 12. The work station 20 receives in-station work-pieces 71 for designated assembly operations within work station envelope 22 and out-of-station work-pieces 72 are queued upstream and outside of electronically enabled work station envelope 99. Work station 20 has at least one associated assembly tool 40 having a pivot point 53 located adjacent to the conveyor footprint 12 at a standard distance from the centerline thereof (A standard distance being selectable from conventional distances of assembly tool offset for the configuration of the conveyor system.) The assembly tool 40 also has a flexible power transfer conduit 46. Assembly tool travel envelope 50 overlaps the position of the points-of-use 75 on in-station work-pieces 71 and also overlaps the position of the points-of-use 75 on at least one out-of-station work-piece 72. Work station 20 is defined by work station forward electronic boundary 17 and by work station rear electronic boundary 18.

Referring now to FIG. 16, the second alternate method includes the following steps: Determine the work station boundary differential distance 221 (designated "X") from work station forward electronic boundary 17 to work station rear electronic boundary 18. (This value of distance is always positive) With in-station work-piece 71 within work station, determine the in-station point-of-use offset distance 223 (designated "Y") from the in-station point-of-use 78 to the work station rear electronic boundary 18. (This value of distance is positive in a downstream direction and negative in an upstream direction) With out-of-station work-piece 72 queued to enter work station 20, determine the out-of-station point-of-use offset distance 225 (designated "Z") from the work station forward electronic boundary 17 to the out-of-station point-of-use 79. (Thi value of distance is positive in a downstream direction and negative in an upstream direction) Determine the lateral offset distance 207 (designated "R") between pivot point 53 and the horizontal transport line 209 followed by the designated points-of-use 75 along the conveyor footprint 12. (This value of distance is always positive) Calculate the pivot point horizontal offset distance 211 (designated "P") of the new position of the pivot point 53 from the work station rear boundary 28 using the formula: P=(X/2)+Y+Z. If the value of P is greater than X, calculate the pivot point negative horizontal offset distance 213 (designated "−P") using the formula: −P=y−x. Referring now to FIG. 13, position the pivot point 53 the pivot point horizontal offset distance 211 from the second fixed stopping point 16 while maintaining the lateral offset distance 207 between pivot point 53 and the horizontal transport line 209. (Note, the pivot point 53 can be either the power and control unit 42 or another rigid structure remote from the power and control unit 42.) Calculate the reduced travel distance 81 (designated "D") using the formula: D=Square root of [(X/2)(X/2)+(R*R)]. Install a clamping assembly 90 upon the flexible power transfer section 45 so as to form a tethered flexible power conduit 47 providing a reduced assembly tool travel envelope 82 having a radius equal to the reduced travel distance 81.

Referring again to FIG. 13, following this second alternate method to reposition the pivot point 53 of the assembly tool 40 and to limit the tool travel of of the assembly tool 40 will result in an assembly tool travel envelope 81 that only overlaps the position of the point-of-use 78 of the in-station work-piece 71 and does not overlap the position of the point-of-use 79 of any out-of-station work-piece 72.

One alternate method of this invention further contemplates using a plurality of tether assemblies to limit the tool of the assembly tool 40 such that assembly tool reduced travel envelope 81 only overlaps the position of the point-of-use 78 of the in-station work-piece 71 and does not overlap the position of the point-of-use 79 of any out-of-station work-piece 72. The assembly tool reduced travel envelope 81 may have various shapes and sizes as necessary to allow overlap of the position of the point-of-use 78 of the in-station work-piece 71 and prevent overlap the position of the point-of-use 79 of any out-of-station work-piece 72.

Thus, although there have been described particular embodiments of the present invention of a new and useful System and Method of Managing Tool Travel in an Assembly Line Operation it is not intended that such references be construed as limitations upon the scope of this invention except as set forth in the following claims.

I claim:

1. A method of limiting the travel of an assembly tool used within a workstation, the method comprising the steps:
   (a) setting at least one spatial boundary of a workstation such that the workstation is adapted to sequentially receive movable work-pieces, the workstation being further adapted to receive only a single work-piece at any one time;
   (b) providing an assembly tool comprising:
      a base;
      an end use device adapted to perform an assembly operation upon such work-pieces;

a flexible connector having a first end connected to the base and a second end connected to the end use device, the flexible connector extendable to a length that allows travel of the end use device beyond a selected boundary of the workstation;
(c) providing a travel limiting assembly adapted to fixedly attach to the assembly tool; and
(d) attaching the travel limiting assembly to at least one portion of the assembly tool such that travel of the end use device is restricted to within a tool travel envelope defined, at least in part, by said selected boundary of the workstation.

2. The method of claim 1, wherein the flexible connector comprises a flexible conduit.

3. The method of claim 2, wherein the flexible conduit comprises at least one power conduit selected from the group consisting of an electrical power cable, an electrical control cable, a pneumatic power hose, a pneumatic control hose, a hydraulic power hose, a hydraulic control hose and combinations thereof.

4. The method of claim 1, wherein the flexible connector comprises a connector selected from the group consisting a rope, a chain, a wire, a cable, an elastic cord and combinations thereof.

5. The method of claim 1, wherein the flexible connector comprises an articulated arm.

6. The method of claim 1, wherein the end use device comprises a tool driven by a motor.

7. The method of claim 1, wherein step (d) comprises the step of:
fixedly attaching the travel limiting assembly to the end use device.

8. The method of claim 7, wherein the travel limiting assembly comprises a flexible tether.

9. The method of claim 1, wherein step (d) comprises the step of;
fixedly attaching the travel limiting assembly to at least one portion of the flexible connector.

10. The method of claim 9, wherein the flexible connector comprises a flexible conduit, and
wherein the travel limiting assembly further comprises:
a clamping assembly fixedly receiving a first portion of the flexible conduit; and
a flexible tether having a first end attached to the clamping assembly and a second end attached to a pivot so as to restrict the travel of the end use device to within a tool travel envelope defined, at least in part, by said selected boundary of the workstation.

11. The method of claim 10, wherein the pivot is attached to the base.

12. The method of claim 10, wherein the pivot is positioned a pivot offset distance from the base.

13. The method of claim 1, wherein step (d) further comprises the step of;
fixedly attaching the travel limiting assembly to at least two portions of the flexible connector.

14. The method of claim 13, wherein the flexible connector comprises a flexible conduit, and
wherein the travel limiting assembly further comprises:
a clamping assembly fixedly receiving a first portion and a second portion of the flexible conduit so as to restrict the travel of the end use device to within said selected boundary of the workstation.

15. The method of claim 1, wherein step (d) comprises the step of;
fixedly attaching the travel limiting assembly to at least one portion of the flexible connector, and
wherein the travel limiting assembly comprises a clamping assembly, the clamping assembly comprising:
a first block having a first channel receiving a first portion of the flexible connector; and
a second block disposed adjacent to the first block so as to fixedly retain the first portion of the flexible connector within the first channel.

16. The method of claim 15, wherein the clamping assembly further comprises:
at least one fastener assembly disposed so as to hold the second block adjacent to the first block;
at least one tamper resistant shield, each tamper resistant shield disposed adjacent to at least one fastener assembly so as to inhibit operation of the adjacent fastener assembly.

17. The method of claim 16, wherein the clamping assembly further comprises:
at least one retaining device, each tamper resistant shield having a retaining device disposed so as to inhibit movement of the tamper resistant shield.

18. The method of claim 17, wherein each retaining device comprises a quality control device selected from the group consisting of a quality control tag, a quality control band, a quality control label, and a quality control tape.

19. A method for performing assembly operations upon a plurality work-pieces moved by an automatic conveyance system, the method comprising the steps:
(a) moving a plurality of work-pieces along a conveyor footprint by means of an automatic conveyance system, each work-piece having a first point-of-use;
(b) providing a primary workstation disposed upon the conveyor footprint and at least one secondary workstation disposed upon the conveyor footprint adjacent to the primary workstation, the primary workstation being further adapted to receive only a single work-piece at any one time,
the primary workstation having a first assembly tool disposed so as to perform a first assembly operation upon the first point-of-use of each such work-piece as may be sequentially received within the primary workstation, the first assembly tool comprising:
a base;
an end use device adapted to perform a first assembly operation upon the first point-of-use of such work-pieces; and
a flexible connector having a first end connected to the base and a second end connected to the end use device, the flexible connector being extendable such that, for at least one secondary workstation, the travel of the end use device would allow the end use device to be positioned so as to perform a first assembly operation upon the first point-of-use of at least one such work-piece as may be received within such secondary workstation;
(c) providing a travel limiting assembly adapted to fixedly attach to the first assembly tool; and
(d) attaching the travel limiting assembly to at least one portion of the first assembly tool such that travel of the end use device is restricted so as to prevent the end use device from being positioned upon the first point-of-use of any such work-piece as is received within any secondary workstation.

20. The method of claim 19, wherein at least one secondary workstation comprises an upstream workstation adjacent to the primary workstation, the automatic conveyance system adapted to sequentially move a plurality of uniquely identified work-pieces from such upstream workstation into the primary workstation, each uniquely identified work-piece having associated work-piece identification data,
  wherein, the automatic conveyance system further comprises:
  at least one sensor adapted to determine the presence and the work-piece identification data of a uniquely identified work-piece when such work-piece is at a selected fixed point boundary or a selected electronic boundary of the primary workstation; and
  a database having register files associated with the primary workstation, the database adapted to receive and store work-piece identification data in such register files,
  wherein, the automatic conveyance system is adapted to monitor the activation of the first assembly tool and provide to the database such assembly tool activation data as corresponds with selected activations of the first assembly tool,
  wherein, the database is further adapted to update and store assembly tool activation data in the designated register file,
  wherein, the method further comprises the steps performed by the automatic conveyance system, including:
    moving a uniquely identified work-piece from an upstream workstation into the primary workstation;
    determining the presence of the uniquely identified work-piece at a first fixed point boundary of the primary workstation;
    determining the work-piece identification data of such uniquely identified work-piece; and
    recording the work-piece identification data in a database register file associated the primary workstation,
    determining the occurrence of selected activations of the first assembly tool, such selected activations occurring after the automatic conveyance system determines the presence of the uniquely identified work-piece at a first fixed point boundary of the primary workstation,
    providing the associated assembly tool activation data to the database;
    recording the first assembly tool activation data in the database register file associated the primary workstation,
  wherein, the flexible connector of the first assembly tool is extendable such that the travel of the end use device would allow the end use device to be positioned so as to perform a first assembly operation upon the first point-of-use of the uniquely identified work-piece while being moved from the upstream workstation into the primary workstation before the automatic conveyance system determines the presence of the uniquely identified work-piece at the first fixed point boundary of the primary workstation, and
  wherein, step (d) further comprises:
    attaching the travel limiting assembly to at least one portion of the first assembly tool such that travel of the end use device is restricted to within a fixed point tool travel envelope, the fixed point tool travel envelope having a boundary comprising the first fixed point boundary of the primary workstation.

21. The method of claim 20, wherein, the method further comprises the steps performed by the automatic conveyance system, including:
  moving the uniquely identified work-piece out of the primary workstation; and
  determining the presence of the uniquely identified work-piece at a second fixed point boundary of the primary workstation,
  preventing the recording in the database register file of the first assembly tool activation data associated with activations of the first assembly tool occurring after the automatic conveyance system determines the presence of the uniquely identified work-piece at the second fixed point boundary of the primary workstation,
  wherein, selected activations of the first assembly tool comprise activations occurring before the automatic conveyance system determines the presence of the uniquely identified work-piece at the second fixed point boundary of the primary workstation,
  wherein, the flexible connector of the first assembly tool is extendable such that the travel of the end use device would allow the end use device to be positioned so as to perform a first assembly operation upon the first point-of-use of the uniquely identified work-piece as it is being moved out of the primary workstation after the automatic conveyance system determines the presence of the uniquely identified work-piece at the fixed point boundary of the primary workstation, and
  wherein, step (d) further comprises:
    attaching the travel limiting assembly to at least one portion of the first assembly tool such that travel of the end use device is restricted to within a fixed point tool travel envelope, the fixed point tool travel envelope having a boundary comprising the second fixed point boundary of the primary workstation.

22. The method of claim 20, wherein, the automatic conveyance system is adapted to perform the following steps further comprising the method:
  determining the presence of a uniquely identified work-piece at a first electronic boundary of the primary workstation,
  wherein, the selected activations of the first assembly tool comprise activations of the first assembly tool occurring while the uniquely identified work-piece is determined to be within an electronically monitored work envelope, the electronic work envelope defined, at least in part, by the first electronic boundary of the primary workstation and
  wherein, step (d) further comprises:
    attaching the travel limiting assembly to at least one portion of the first assembly tool such that travel of the end use device is restricted to within the electronically monitored work envelope.

23. The method of claim 21, wherein, the automatic conveyance system is adapted to perform the following steps further comprising the method:
  determining the presence of a uniquely identified work-piece at a second electronic boundary of the primary workstation;
  wherein, the electronic work envelope defined, at least in part, by the second electronic boundary of the primary workstation.

24. A method for performing assembly operations upon a plurality work-pieces moved by an automatic conveyance system, the method comprising the steps:
  (a) providing an automatic conveyance system comprising:
  a work-station defined along a conveyor footprint, the work-station comprising:
    a work-station envelope;
    a first fixed stopping point;
    a second fixed stopping point;

a work station forward electronic boundary; and a work station rear electronic boundary; and an integrated conveyor monitoring and control system adapted to control the movement of a plurality of work-pieces into the work-station from an upstream direction and out of the work-station along a downstream direction, each work-piece having at least one point-of-use, wherein the travel of such points-of-use along the conveyor footprint define a horizontal transport line, wherein the work station is adapted to receive an in-station work-piece, the in-station work-piece having an in-station point-of-use for designated assembly operations within work station envelope, and wherein the automatic conveyance system is adapted to que an, out-of-station work-piece having an out-of-station points-of-use upstream and outside of work station envelope;

(b) providing a assembly tool comprising:

a base;

a pivot;

an end use device adapted to perform a designated assembly operation upon such points-of-use;

a flexible power transfer conduit having a first end connected to the base and a second end connected to the end use device, the flexible power transfer conduit extendable to a length that allows travel of the end use device within a assembly tool travel envelope which overlaps the position of the in-station points-of-use on such in-station work-pieces and also overlaps at least one out-of-station points-of-use on such out-of-station work-piece;

(c) providing a clamping assembly having a first end adapted to attach to the pivot and a second end adapted to connected to the flexible power transfer conduit so as to restrict the travel of the travel of the end use device;

(d) measuring a fixed stopping point differential distance, the fixed stopping point differential distance being the scalar distance between the first fixed stopping point and the second fixed stopping point;

(e) measuring an in-station point-of-use offset distance, the in-station point-of-use offset distance being the distance measured from the in-station point-of-use to the second fixed stopping point, the in-station point-of-use offset distance being a positive value when measured along the downstream direction and negative when measured along the upstream direction;

(f) measuring an out-of-station point-of-use offset distance, the out-of-station point-of-use offset distance being the distance measured from the work station forward electronic boundary to the out-of-station point-of-use, the out-of-station point-of-use offset distance being a positive value when measured along the downstream direction and negative when measured along the upstream direction;

(g) calculating a lateral offset distance, the lateral offset distance being the scalar distance measured between the pivot point and a horizontal transport line;

(h) calculating a pivot point positive horizontal offset using the formula: $P=(X/2)+Y+Z$, wherein:

P equals the pivot point horizontal offset distance;

X equals the fixed stopping point differential distance;

Y equals the in-station point-of-use offset distance; and

Z equals the out-of-station point-of-use offset distance;

(i) calculating a pivot point negative horizontal offset using the formula: $P=X-Y$, wherein:

P equals the pivot point horizontal offset distance;

X equals the fixed stopping point differential distance;

Y equals the in-station point-of-use offset distance; and (j) positioning the pivot to a point being a pivot point horizontal offset distance from the second fixed stopping point and being the lateral offset distance from the horizontal transport line, wherein, if the value of P is greater than the value of X, then the pivot point horizontal offset distance equals the pivot point negative horizontal offset distance, else the pivot point horizontal offset distance equals the pivot point positive horizontal offset distance (k) calculating a reduced travel distance using the formula: $D=[(X/2)(X/2)+(R*R)]^{1/2}$, wherein D equals the reduced travel distance;

X equals the fixed stopping point differential distance; and

R equals the lateral offset distance; and (l) attaching the first end of the clamping assembly to the pivot and attaching the second end of the clamping assembly to the flexible power transfer section so as to form a tethered flexible power conduit providing a reduced assembly tool travel envelope having a radius equal to the reduced travel distance.

25. A method for performing assembly operations upon a plurality work-pieces moved by an automatic conveyance system, the method comprising the steps:

(a) providing an automatic conveyance system including a work-station defined along a conveyor footprint, the work-station comprising:

a work-station envelope;

a workstation forward boundary; and a work station rear boundary, wherein the automatic conveyance system is adapted to move a plurality of work-pieces into the work-station from an upstream direction and out of the work-station along a downstream direction, each work-piece having at least one point-of-use, and wherein the travel of such points-of-use along the conveyor footprint define a horizontal transport line, wherein the work station is adapted to receive an in-station work-piece, the in-station work-piece having an in-station point-of-use for designated assembly operations within work station envelope, and wherein the automatic conveyance system is adapted to que an out-of-station work-piece having an out-of-station points-of-use upstream and outside of work station envelope;

(b) providing a assembly tool comprising:

a base;

a pivot;

an end use device adapted to perform a designated assembly operation upon such points-of-use;

a flexible power transfer conduit having a first end connected to the base and a second end connected to the end use device, the flexible power transfer conduit extendable to a length that allows travel of the end use device within a assembly tool travel envelope which overlaps the position of the in-station points-of-use on such in-station work-pieces and also overlaps at least one out-of-station points-of-use on such out-of-station work-piece;

(c) providing a clamping assembly having a first end adapted to attach to the pivot and a second end adapted to connected to the flexible power transfer conduit so as to restrict the travel of the travel of the end use device;

(d) measuring a work station differential distance, the work station differential distance being the scalar distance between the work station forward boundary and work station rear boundary;

(e) measuring an in-station point-of-use offset distance, the in-station point-of-use offset distance being the distance measured from the in-station point-of-use to the work station rear boundary, the in-station point-of-use offset distance being a positive value when measured along the downstream direction and negative when measured along the upstream direction;

(f) measuring an out-of-station point-of-use offset distance, the out-of-station point-of-use offset distance being the distance measured from the work station forward boundary to the out-of-station point-of-use, the out-of-station point-of-use offset distance being a positive value when measured along the downstream direction and negative when measured along the upstream direction;

(g) calculating a lateral offset distance, the lateral offset distance being the scalar distance measured between the pivot point and a horizontal transport line;

(h) calculating a pivot point positive horizontal offset using the formula: $P=(X/2)+Y+Z$, wherein:
P equals the pivot point horizontal offset distance;
X equals the work station differential distance;
Y equals the in-station point-of-use offset distance; and
Z equals the out-of-station point-of-use offset distance;

(i) calculating a pivot point negative horizontal offset using the formula: $P=X-Y$, wherein:
P equals the pivot point horizontal offset distance;
X equals the work station differential distance;
Y equals the in-station point-of-use offset distance; and (j) positioning the pivot to a point being a pivot point horizontal offset distance from the second fixed stopping point and being the lateral offset distance from the horizontal transport line,
wherein, if the value of P is greater than the value of X, then the pivot point horizontal offset distance equals the pivot point negative horizontal offset distance, else the pivot point horizontal offset distance equals the pivot point positive horizontal offset distance (k) calculating a reduced travel distance using the formula: $D=[(X/2)(X/2)+(R*R)]^{1/2}$, wherein
D equals the reduced travel distance;
X equals the fixed stopping point differential distance; and
R equals the lateral offset distance; and (l) attaching the first end of the clamping assembly to the pivot and attaching the second end of the clamping assembly to the flexible power transfer section so as to form a tethered flexible power conduit providing a reduced assembly tool travel envelope having a radius equal to the reduced travel distance.

* * * * *